(12) United States Patent
Fäs et al.

(10) Patent No.: US 9,377,296 B2
(45) Date of Patent: Jun. 28, 2016

(54) LASER-BASED COORDINATE MEASURING DEVICE HAVING A FIXED/LOOSE BEARING APPARATUS

(71) Applicant: LEICA GEOSYSTEMS AG, Heerbrugg (CH)

(72) Inventors: Markus Fäs, Oberkulm (CH); Veroljub Maksimovic, Biberist (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 14/367,202

(22) PCT Filed: Dec. 11, 2012

(86) PCT No.: PCT/EP2012/075126
§ 371 (c)(1),
(2) Date: Jun. 19, 2014

(87) PCT Pub. No.: WO2013/092319
PCT Pub. Date: Jun. 27, 2013

(65) Prior Publication Data
US 2015/0002857 A1   Jan. 1, 2015

(30) Foreign Application Priority Data
Dec. 20, 2011 (EP) .................................... 11194643

(51) Int. Cl.
*G01B 11/00* (2006.01)
*G01C 15/00* (2006.01)
(52) U.S. Cl.
CPC ............ *G01B 11/005* (2013.01); *G01C 15/002* (2013.01); *Y10T 29/49826* (2015.01)
(58) Field of Classification Search
CPC ......... G01S 17/08; G01S 17/06; G01S 17/66; G01C 15/002; G01C 3/00; G01B 11/005; G01B 11/026; G01B 11/14
USPC .............. 356/614–623; 33/290–292; 73/1.79; 702/151
See application file for complete search history.

(56) References Cited

U.S. PATENT DOCUMENTS 6,338,576 B1   1/2002   Gigardin et al.
6,622,391 B1 *   9/2003   Shirai et al. ..................... 33/292
(Continued)

FOREIGN PATENT DOCUMENTS

CN   201672922 U   12/2010
DE   10 2008 024 909 A1   11/2009
(Continued)

OTHER PUBLICATIONS

European Search Report dated May 9, 2012 as received in Application No. EP 11 19 4643.

*Primary Examiner* — Hoa Pham
(74) *Attorney, Agent, or Firm* — Maschoff Brennan (57) ABSTRACT

A laser based measuring apparatus for measuring a position of a distant target is disclosed. Some embodiments may include a laser tracker for detecting the position and the orientation of a measuring aid The laser-based measuring apparatus may include a base, a support, a telescope unit means, a first bearing apparatus, and a second bearing apparatus. In some embodiments the first bearing apparatus is in the form of a fixed/loose bearing apparatus, having a shaft, the longitudinal axis of which runs coaxially with the tilt axis, a fixed bearing and a loose bearing, and/or the second bearing apparatus is in the form of a fixed/loose bearing apparatus, having a shaft, the longitudinal axis of which runs coaxially with the vertical axis, a fixed bearing and a loose bearing.

26 Claims, 7 Drawing Sheets

(56) References Cited

U.S. PATENT DOCUMENTS

| | | | |
|---|---|---|---|
| 7,793,424 B2* | 9/2010 | Laabs et al. | 33/290 |
| 7,933,055 B2 | 4/2011 | Jensen et al. | |
| 8,031,331 B2 | 10/2011 | Meier et al. | |
| 8,411,285 B2* | 4/2013 | Sharp | 356/614 |
| 2005/0172503 A1* | 8/2005 | Kumagai et al. | 33/290 |
| 2006/0021236 A1* | 2/2006 | Endo | 33/290 |
| 2006/0191148 A1* | 8/2006 | Lippuner | 33/290 |
| 2009/0144999 A1 | 6/2009 | Lau | |
| 2011/0131824 A1* | 6/2011 | Yanobe et al. | 33/292 |
| 2012/0326709 A1* | 12/2012 | Westermark et al. | 324/207.25 |
| 2016/0033258 A1* | 2/2016 | Bockem | G01B 21/042 356/4.01 |

FOREIGN PATENT DOCUMENTS

| | | |
|---|---|---|
| EP | 1 061 335 B1 | 10/2006 |
| JP | 61-193012 A | 8/1986 |
| JP | 63-124929 A | 5/1988 |
| JP | 05-223571 A | 8/1993 |
| JP | 2000-297815 A | 10/2000 |
| JP | 2000-356518 A | 12/2000 |
| JP | 2001-141458 A | 5/2001 |
| JP | 2008-180362 A | 8/2008 |
| JP | 2009-197988 A | 9/2009 |
| JP | 2010-501069 A | 1/2010 |
| JP | 2011-123079 A | 6/2011 |
| WO | 2007/079600 A1 | 7/2007 |
| WO | 2011/098127 A1 | 8/2011 |

\* cited by examiner

LASER-BASED COORDINATE MEASURING DEVICE HAVING A FIXED/LOOSE BEARING APPARATUS

FIELD OF THE INVENTION

The present invention relates to a laser-based coordinate measuring device, in particular configured as a laser tracker, for measuring coordinates on target objects, comprising at least one fixed/loose bearing apparatus for a shaft of a rotatable telescope unit and/or for a shaft of a rotatable support, and to the use of a fixed/loose bearing apparatus for such a coordinate measuring device.

BACKGROUND

A coordinate measuring device of the type mentioned in the introduction comprises a base which defines an upright axis, a support, and a telescope unit for emitting a measurement beam and for receiving at least a part of the measurement radiation reflected at a target. The orientation of the telescope unit is carried out in two axes (upright axis or vertical axis, and inclination axis or tilt axis) by means of motors. The support can be swiveled in a motorized fashion about the upright axis relative to the base, and the telescope unit can be swiveled in a motorized fashion about a tilt axis relative to the support. A measurement axis is defined by an emission direction of the measurement radiation.

The telescope unit is equipped with opto-electro-mechanical components and is mounted, rotatably by means of a shaft about the tilt axis, at one or two bearing positions on the support, which is optionally likewise equipped with opto-electro-mechanical components.

WO 2007/079600 A1 discloses, with a laser tracker, such a laser-based coordinate measuring device having a telescope unit which can be rotated with respect to at least two axes and in which light emission and light reception optics of the distance measuring apparatus, a measurement camera and a viewfinder camera are arranged. The telescope element is mounted, rotatably about a tilt axis, on a support element, and the support element is mounted, rotatably about an upright axis, on a stationary base.

In coordinate measuring devices of the type mentioned in the introduction, which are known from the prior art, a shaft is respectively mounted fixed on both sides along the tilt axis and/or the upright axis. If, as is generally usual, different materials are used for the shaft, bearing or support, the clamping of the bearing varies as a function of the working temperature range. The flow of force which results from the clamping of the bearing of the tilt axis is transmitted via the brace of the support to the tilt axis. Hysteresis effects detrimentally affect the accuracy of the coordinate measuring device.

Radial displacement of the axes, for example by bearing air, in this case leads to accuracy losses.

SUMMARY

Some embodiments of the invention may provide for a bearing concept for a coordinate measuring device of the type mentioned in the introduction, which improves the accuracy of the measurement in comparison with the prior art.

Some embodiments of the invention may include the laser-based measuring apparatus, having a fixed/loose bearing apparatus and by the use of a fixed/loose bearing apparatus in a laser-based measuring apparatus.

According to the invention, a laser-based coordinate measuring device comprises, along the tilt axis and/or along the upright axis, a shaft mounted by means of a fixed/loose bearing.

Preferably, a support, rotatable about the upright axis, of the coordinate measuring device in this case has a shaft mounted in a base by means of a fixed/loose bearing. Furthermore, a telescope unit, rotatable about the tilt axis, of the coordinate measuring device preferably has a shaft mounted on the support by means of a fixed/loose bearing.

The advantages of this fixed/loose bearing according to the invention over the prior art are, in particular, as follows:

no axial and radial play occurs at the fixed bearing;
an expansion of the shaft, for example thermally induced, is non-critical;
the axial position is accurately defined under axial loading, and
the running of the shaft is very precise.

In the fixed/loose bearing, according to the invention, of the shaft, the absorption of the axial forces in both directions is undertaken by a single bearing or a bearing group, the so-called fixed bearing. Besides the axial forces, the fixed bearing also absorbs radial forces and transmits these to adjacent components of the support. In this way, the disadvantages of a pure fixed bearing are eliminated without accuracy losses occurring, as for example due to wobble.

According to the invention, the clamping of the bearing (or of a bearing group) takes place only on one side. Axial errors due to thermal effects, and the accuracy losses resulting therefrom, are thus minimized. Furthermore, thermally induced expansion of the shaft is non-critical and does not affect clamping of the bearing. The clamping of the bearing therefore remains constant over the entire working temperature range. The connecting parts are touched to the least possible extent by the clamped bearing, so that hysteresis effects are minimized. The overall axis system has a high rigidity.

The fixed bearing comprises one or more ball bearings, in particular rolling bearings. Preferably, two rolling bearings are installed pairwise. This may, for example, be achieved by means of a duplex bearing which is composed of two paired rolling bearings with identical tolerance ranges. The clamping of the duplex bearing takes place on one side. In a so-called O arrangement, the construction is carried out by axial prestress on a block of the inner ring, or the outer ring in the case of a so-called X arrangement. With the width of the outer or inner ring, the desired prestress can be defined by the prior processing.

As an alternative, the fixed bearing may also comprise two individual rolling bearings. The assembly is carried out by axial prestress of the inner ring in the O arrangement, or the outer ring in the X arrangement. The outer or inner ring may be clamped with an intermediate ring and a spring assembly. The prestress can be adjusted variably with the spring assembly.

According to the invention, the loose bearing is intended only to absorb radial forces, the radial load being distributed between the loose bearing and the fixed bearing. The loose bearing does not absorb any axial forces, and is mobile in the axial direction. As an alternative, it is also possible to use a loose bearing which is immobile relative to the support and permits axial movement of the shaft. The running paths are configured cylindrically, so that axial displacement of the shaft is possible. Both running surfaces have a high hardness quality. The loose bearing preferably comprises a ball bearing with a ball cage, which may in particular comprise a plurality of rows of balls slightly offset from one another, so that each ball describes its own running path. This is advantageous inter alia in order to avoid wear, and prevents several or all of the balls from running on a defective running path in the event of shock damage to a running path.

The degree of clamping of the loose bearing is carried out by means of the processing of the connecting parts. The rolling body has a slight oversize relative to the inner and outer running surfaces. By assembly of the rolling body, shaft and flange, the bearing is clamped. The clamping is thus selected in such a way that optimal rolling of the rolling body is ensured.

In a particularly preferred embodiment, a first fixed/loose bearing is distributed between two braces of the support, in such a way that the shaft is mounted on one side of the telescope unit with a fixed bearing and on the other side with a loose bearing.

Since no bearing air can be tolerated because of the very high accuracy requirements in coordinate measuring devices, both the loose bearing and the fixed bearing are preferably prestressed—the loose bearing radially and the fixed bearing both axially and radially.

The rolling bearings are preferably not set or clamped directly in adjacent components of the aluminum brace, but in connecting parts made of steel. The desired fit between the bearing and the flange is therefore preserved over the entire working temperature range. The steel connecting parts are connected firmly to the aluminum components. Axial errors due to thermal effects, and the accuracy losses resulting therefrom, are minimized.

If the fixed bearing is configured in order to absorb axial forces which, in any orientation of the measuring apparatus, exceed the forces which occur owing to the intrinsic weight of the measuring apparatus, the bearing according to the invention furthermore allows the coordinate measuring device to be set up at an inclination to the vertical, without wobble of the axis occurring. Even an upside-down setup, in which the support hangs from the base, is possible.

As rolling bearings, it is also possible to use so-called hybrid bearings, in which the rolling bodies are made of ceramic instead of steel. A main advantage of this solution is a higher possible accuracy by virtue of higher accuracy classes. Irreproducible errors, for example wobble errors or hysteresis effects, are thereby minimized. This has a direct effect on the accuracy of the coordinate measuring device. Furthermore, ceramic has a lower coefficient of friction compared with steel, for which reason the lifetime of such a bearing can be extended, depending on the operating mode. Hybrid bearings furthermore have better operating properties under emergency conditions.

Preferably, a motor is furthermore provided, which is accommodated particularly in the brace containing the fixed bearing and which is intended to drive the shaft on the side with fixed bearing. In particular, a direct-drive motor—that is to say a motor without intermediate transmission, for example a piezo motor—may advantageously be used for this, in order to be able to avoid errors due to play in the transmission.

Also preferably, an angle measurement functionality for determining an orientation of the telescope unit relative to the base is provided, in particular an angle encoder, which is accommodated in the brace containing the loose bearing and is intended to determine absolute or relative positions of the shaft.

In order to save weight, the shaft may preferably be configured as a hollow shaft. This furthermore makes it possible to feed supply lines into the telescope unit inside the shaft. These are, in particular, cables for supplying components of the telescope unit with electrical current or light guides for introducing a light beam into optical components of the telescope unit. The latter is necessary in particular when the distance measuring apparatus is accommodated fully or partially outside the telescope unit, or the laser beam is generated outside the telescope unit, for example by a laser module in the support.

Since the shaft extends along the tilt axis, it intersects a measurement axis—preferably extending orthogonally to the tilt axis. In a preferred embodiment, the shaft therefore has an opening at this position for a beam path of the optical distance measuring unit.

As an alternative, the shaft may also consist of two parts, which connect the telescope unit to the support on both sides. A first part of the shaft is then mounted on the fixed bearing and connected to the facing side of the telescope unit, while a second part of the shaft is mounted on the loose bearing and connected to the other side of the telescope unit. The shaft is then accommodated inside the telescope unit, which may be advantageous in particular for reasons of space. The stability and rigidity of the bearing must, however, be ensured by components of the telescope unit.

In an alternative embodiment, the loose bearing may also be configured as a sliding, air or magnetic bearing. In another alternative embodiment, the loose bearing may also be omitted. In this case, the shaft is mounted exclusively on one side with a single fixed bearing.

BRIEF DESCRIPTION OF THE DRAWINGS

Other advantages and characteristics of the invention may be found in the following description of currently preferred embodiments in connection with the appended figures. In the figures.

DETAILED DESCRIPTION

Figure 1:
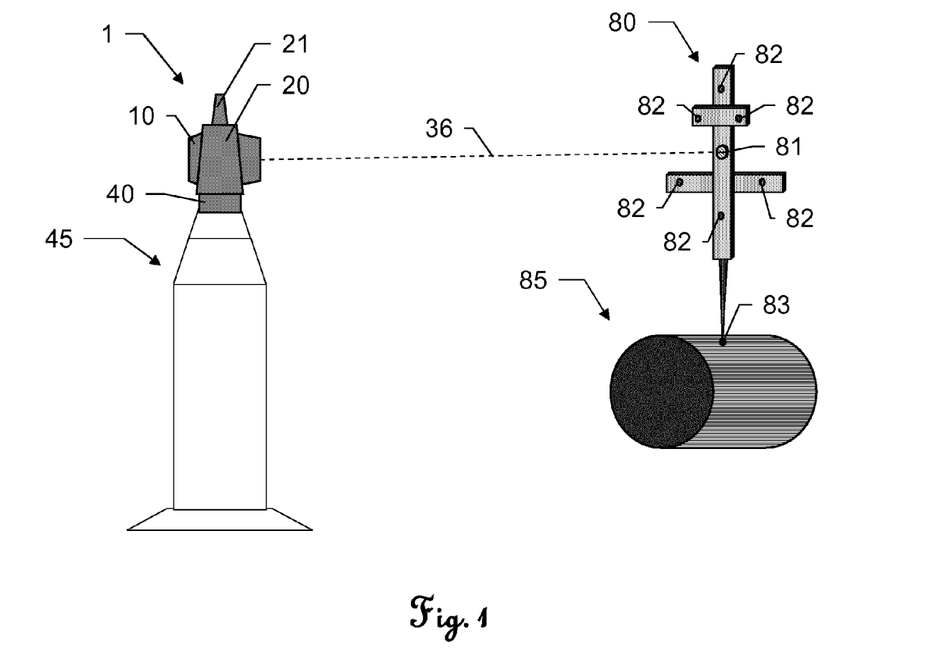
FIG. 1 schematically shows a coordinate measuring device according to the invention and a measurement aid.

FIG. 1 shows a coordinate measuring device according to the invention, configured as a laser tracker 1, comprising a base 40, a support 20, which is fitted thereon and has a handle 21, and a telescope unit 10 mounted on two braces (not represented) of the support 20. The laser tracker 1 shown is arranged on a stand 45 and, by means of a laser beam 36, measures the distance to a retroreflector 81 located on a measurement aid 80. The measurement aid 80—configured here, by way of example, as a measurement probe—furthermore comprises a number of target markings 82, for example in the form of reflective or self-illuminating light points, and a measurement head 83 for placement on a target point to be measured on a target object 85.

The laser tracker 1 contains a measurement camera, which is configured in particular as a focusable vario camera system with variable magnification, in order to acquire the target markings 82 arranged on the measurement aid 80. With the aid of the positions, acquired with the aid of the measurement camera, of the target markings 82, the spatial orientation of the measurement aid 80 can be determined.

In order to be able to acquire and track movements of the measurement aid 80, so that the laser beam 36 remains aligned with the retroreflector 81, the laser tracker 1 has a position-sensitive detector (PSD), in particular a 2D tracking sensor, as disclosed for example in WO 2007/079600 A1.

The PSD is preferably arranged in the telescope unit 10, and by acquiring the orientation of the laser beam reflected by a target, in particular the retroreflector 81, makes it possible to track the alignment of the laser beam 36. By tracking the laser beam alignment, continuous target tracking of the target point can be carried out, and the distance and position of the target point relative to the measuring device can be determined continuously.

Figure 2:
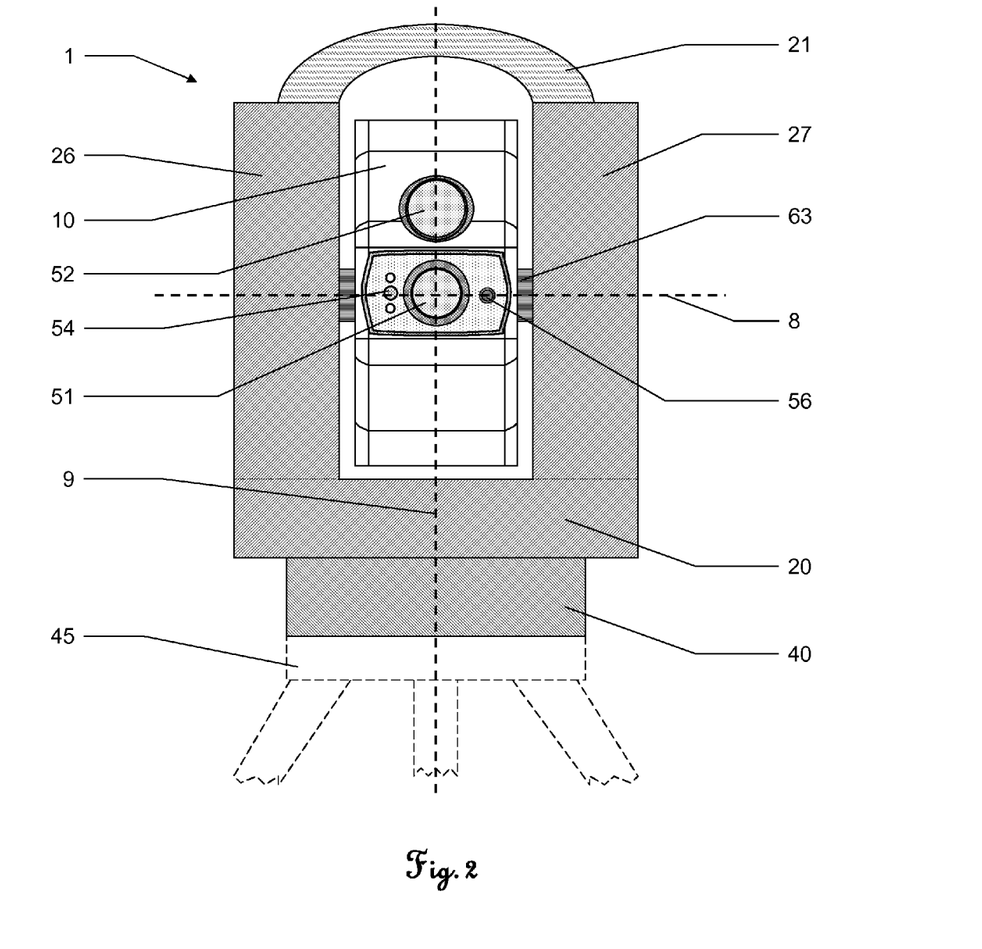
FIG. 2 schematically shows a coordinate measuring device according to the invention in a front view.

FIG. 2 shows an exemplary embodiment of a coordinate measuring device according to the invention, configured as a laser tracker 1, in a front view. The laser tracker 1 comprises a base 40, which can be fastened on a holding apparatus, here represented in the form of a stand 45. A support 20 is fitted, mounted rotatably about the vertical axis 9, on the base 40. The support 20 comprises a first brace 26 and a second brace 27, which project upward from the support 20 and on which a telescope unit 10 is mounted, tiltably about the horizontal axis 8, by means of a shaft 63. A handle 21 for transport and handling of the laser tracker 1 is fitted on the two braces 26, 27. The handle 21 may be connected firmly to the braces 26, 27, for example produced from casting therewith, or welded, so that it serves as an additionally stabilizing element for the braces 26, 27, particularly in respect of bending.

In this exemplary embodiment, a plurality of optics are provided on the telescope unit 10, in particular optics 52 of a measurement camera, as well as laser emission and reception optics 51 of an optical distance measuring apparatus. The telescope unit 10 furthermore preferably comprises optics of a localization camera 54 for approximate localization of the measurement aid 80 and optics of a viewfinder camera 56 to provide images for a user.

Figure 3A:
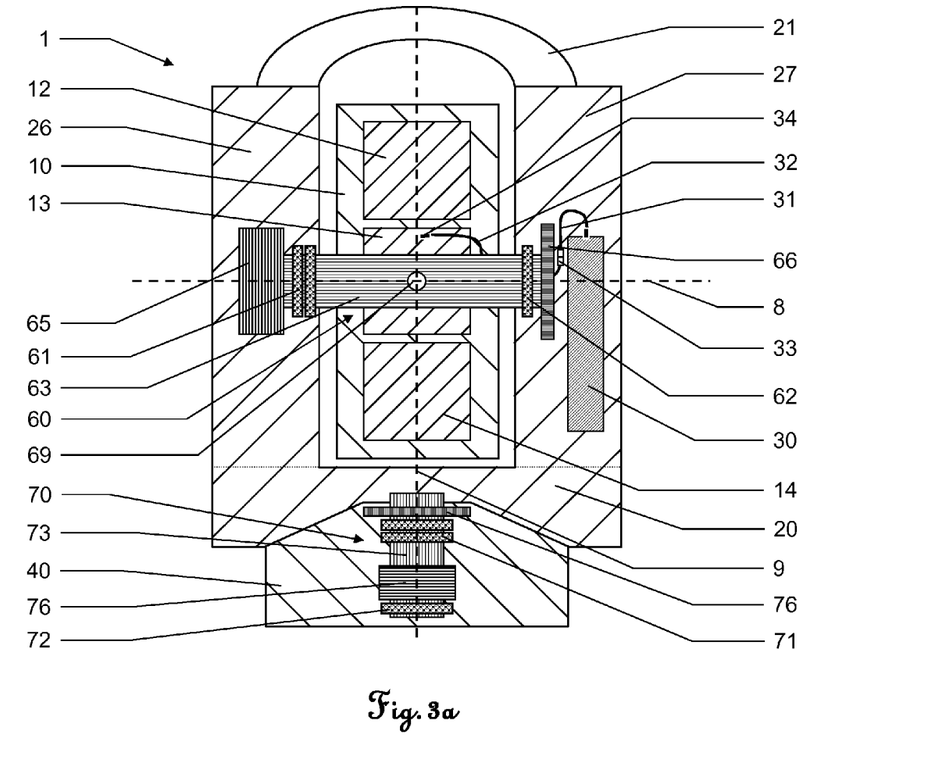
FIG. 3a schematically shows a first embodiment of a coordinate measuring device according to the invention in cross section with a representation of two fixed/loose bearing apparatuses.

FIG. 3a shows, in a cross section through the laser tracker 1 of FIG. 2, a view of a first embodiment of a first fixed/loose bearing apparatus 60 according to the invention on the suspension of the telescope unit 10, and a second fixed/loose bearing apparatus 70 according to the invention on the support 20 and base 40. The telescope unit 10 comprises various optical components inside it, inter alia a measurement camera 12 for acquiring a spatial orientation of the measurement aid 80 and an optical distance measuring apparatus with an interferometer 13 and an absolute distance meter 14 for measuring the distance to the measurement aid 80. The measurement camera 12 is configured as a focusable vario camera system with variable magnification.

The first fixed/loose bearing apparatus 60 allows rotatability of the telescope unit 10 about the tilt axis 8 and contains a shaft 63 mounted in the two lateral braces 26, 27, a fixed bearing 61 being provided in the first brace 26 and a loose bearing 62 being provided in the second brace 27. A direct-drive motor 65 is also provided in the first brace 26 in order to drive the shaft 63 in rotation. An angle encoder 66 is provided in the second brace 27 in order to acquire relative and/or absolute positions of the shaft 63, so as to determine a current orientation of the telescope unit 10.

The shaft 63 is preferably made of steel, brass or ceramic, and is essentially cylindrical, in particular having cylindrical running surfaces on the bearings 61, 62. The shaft 63 is hollow, so that it is suitable for receiving supply lines such as cables or light guides 31, 32. In the direction of a measurement axis defined by an emission direction of the measurement radiation, in particular extending orthogonally to the tilt axis 8 and to the upright axis 9, the shaft 63 has a vertical opening 69, in particular for a beam path of the optical distance measuring apparatus.

A laser module 30 is integrated into the support 20, or into one of the braces 26, 27, preferably a helium-neon laser module, here represented in the second brace 27. A light guide system, comprising a first fiber 31 and a second fiber 32, leads from this laser module 30 through the shaft 63 into the telescope unit 10, as far as a collimator 34 of the interferometer 13. The first fiber 31, extending in the first brace 27, of the light guide system is connected rotation-free via a jack connection 33, preferably provided in the first brace 27, to the second fiber 32, extending in the telescope unit 10, of the light guide system. Arranging the jack connection 33 in the vicinity of the laser module 30 in the support 20 has the advantage that the laser module together with the first fiber 31 can be replaced more easily.

The second fixed/loose bearing apparatus 70 allows rotatability of the support 20 about the upright axis 9 and contains a shaft 73 mounted in the base 40 and fastened on the support, a fixed bearing 71 being provided in the upper part, facing toward the support 20, of the base 40, and a loose bearing 72 being provided in the lower part. A direct-drive motor 75 is provided at the loose bearing 72 in order to drive the shaft 73 in rotation. An angle encoder 76 is provided the fixed bearing 71 in order to acquire relative and/or absolute positions of the shaft 73, so as to determine a current orientation of the support 20.

Although this embodiment contains two fixed/loose bearing apparatuses, it is likewise conceivable for only one bearing apparatus to be configured as a fixed/loose bearing apparatus.

Figure 3B:
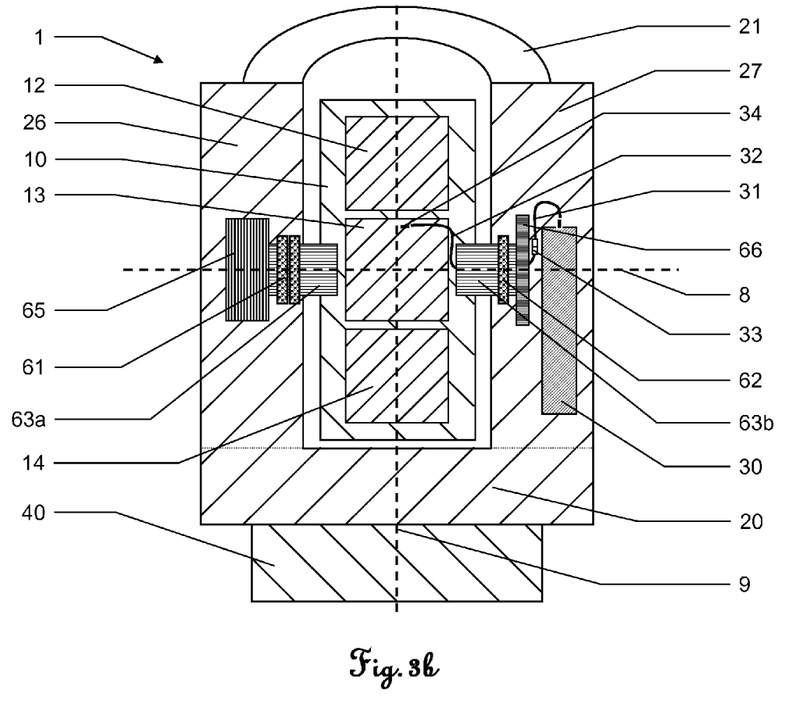
FIG. 3b schematically shows a second embodiment of a coordinate measuring device according to the invention in cross section with a representation of one fixed/loose bearing apparatus.

FIG. 3b represents a second embodiment according to the invention of the first fixed/loose bearing apparatus 60 according to the invention in a cross section through a laser tracker 1. In contrast to the embodiment represented in FIG. 3a, the shaft consists of a first part 63a and a second part 63b. Radial and axial forces in this case need to be transmitted via components of the telescope unit 10. These components are therefore preferably formed particularly stably and rigidly. In particular, they may consist of the same material as the shaft. A second fixed/loose bearing apparatus 70 is not represented in this exemplary embodiment, but is optionally possible.

Figure 4A:
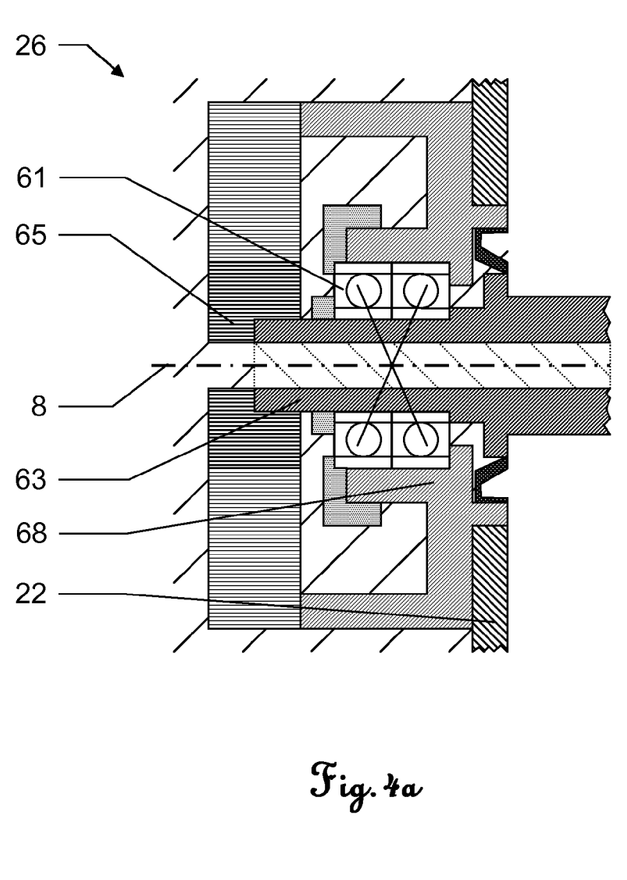
FIG. 4a schematically shows a cross section through the shaft and the fixed bearing.
Figure 4B:
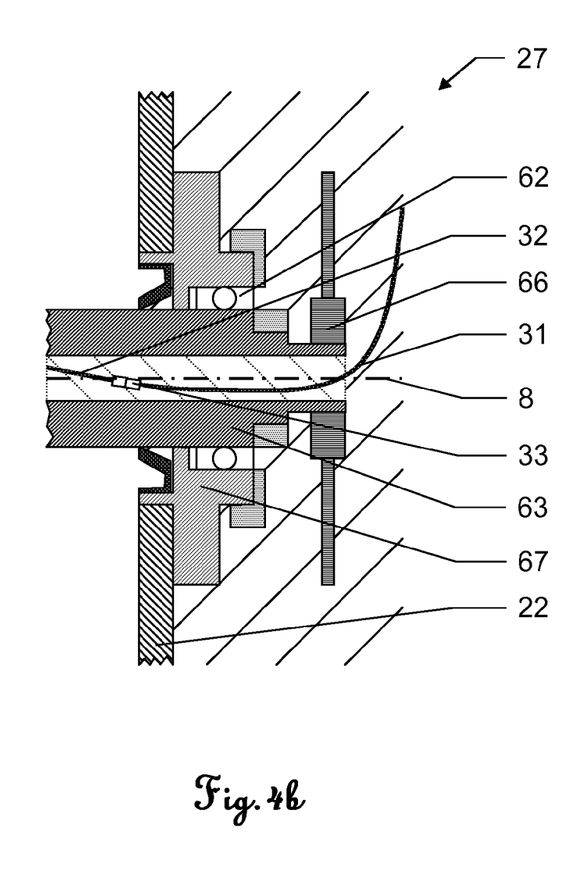
FIG. 4b schematically shows a cross section through the shaft and the loose bearing.

FIGS. 4a and 4b respectively represent in cross section a part of the shaft 63 of the first fixed/loose bearing apparatus 60 with its respective mounting in the braces 26, 27. FIG. 4a shows the mounting on the first brace 26 with the fixed bearing 61, and FIG. 4b shows the mounting on the second brace 27 with the loose bearing 62. The shaft 63 is hollow and has a cylindrical shape at the mountings.

The fixed bearing 61 represented in FIG. 4a has two pairwise arranged rolling bearings, in particular a duplex spindle bearing pair or a UKF® spindle bearing with spacer balls. An X arrangement of the pairwise arranged rolling bearings is represented by way of example.

The loose bearing 62 represented in FIG. 4b has a ball bearing with a ball cage, which is intended to absorb radial forces. The loose bearing 62 is fixed on the shaft 63 and arranged movably in the axial direction in the brace 27, in order to be able to move stress-free with the shaft 63 in the event of thermally induced expansion variations of the latter. The rolling body of the loose bearing 62 has a certain oversize relative to the inner and outer running surfaces. Both running surfaces have a high hardness quality.

The bearings 61, 62 are not mounted directly in adjacent lightweight components, in particular consisting of aluminum, of the braces 26, 27, but in connecting parts 67, 68 made of steel. The desired fit between the bearing and the flange is therefore maintained over the entire working temperature range. The steel connecting parts 67, 68 are connected firmly to components 22 of the braces 26, 27. Axial errors due to thermal effects, and accuracy losses resulting therefrom, are thus minimized.

An optional light guide system, fed through the hollow shaft 63, is also represented in FIG. 4b. It comprises a second fiber 32, which leads into the telescope unit, a first fiber 31, which leads to a laser module in the second brace 27, and a jack connection 33 for rotation-free connection of the two fibers. The jack connection 33 is arranged inside the shaft 63 in this exemplary embodiment.

Figure 5A:
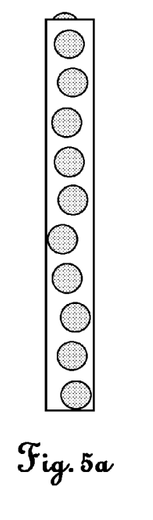
FIGS. 5a-c schematically show two embodiments of the ball cage of a loose bearing according to the invention.
Figure 5B:
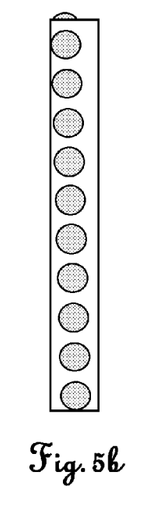
Figure 5C:
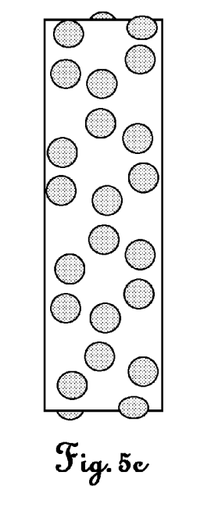

FIGS. 5a to 5c each represent an exemplary embodiment of a ball cage of the loose bearing 62, 72 in a side view. The balls of the ball cage consist of steel or ceramic, and are respectively arranged slightly offset from one another so that each ball describes its own running path. This is advantageous in order to avoid wear, and prevents several or all of the balls from running on a defective running path in the event of shock damage to a running path.

Figure 6A:
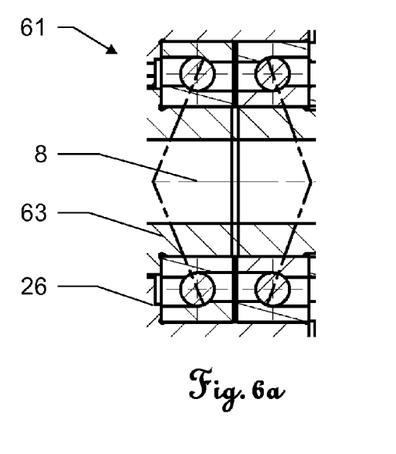
FIGS. 6a-b schematically show two embodiments of a fixed bearing according to the invention.
Figure 6B:
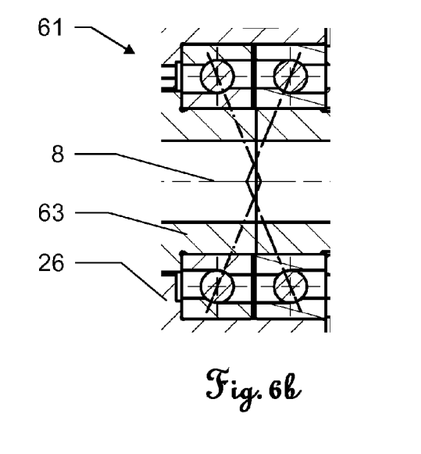

Two exemplary embodiments of the fixed bearing 61 of the first fixed/loose bearing apparatus 60 are represented in FIGS. 6a and 6b. A detail around the fixed bearing 61 with a section of the shaft 63 and the surrounding first brace 26 are respectively shown. The tilt axis 8 is likewise represented. The same applies for the fixed bearing 71 of the second fixed/loose bearing apparatus 70.

FIG. 6a shows a first embodiment of the fixed bearing 61, with two paired rolling bearings in a so-called O arrangement. The connecting lines of the ball contact points diverge in the direction of the shaft 63. A greater support width is therefore obtained, which makes the unit very rigid. The O arrangement allows reversible axial and radial loads, and ensures less tilting play.

FIG. 6b shows a second embodiment of the fixed bearing 61, with two paired rolling bearings in a so-called X arrangement. The connecting lines of the ball contact points converge in the direction of the shaft 63. A smaller support width is therefore obtained, which leads to reduced angular rigidity of the unit. The X arrangement permits greater alignment deviations, and likewise allows reversible axial and radial loads.

Figure 7:
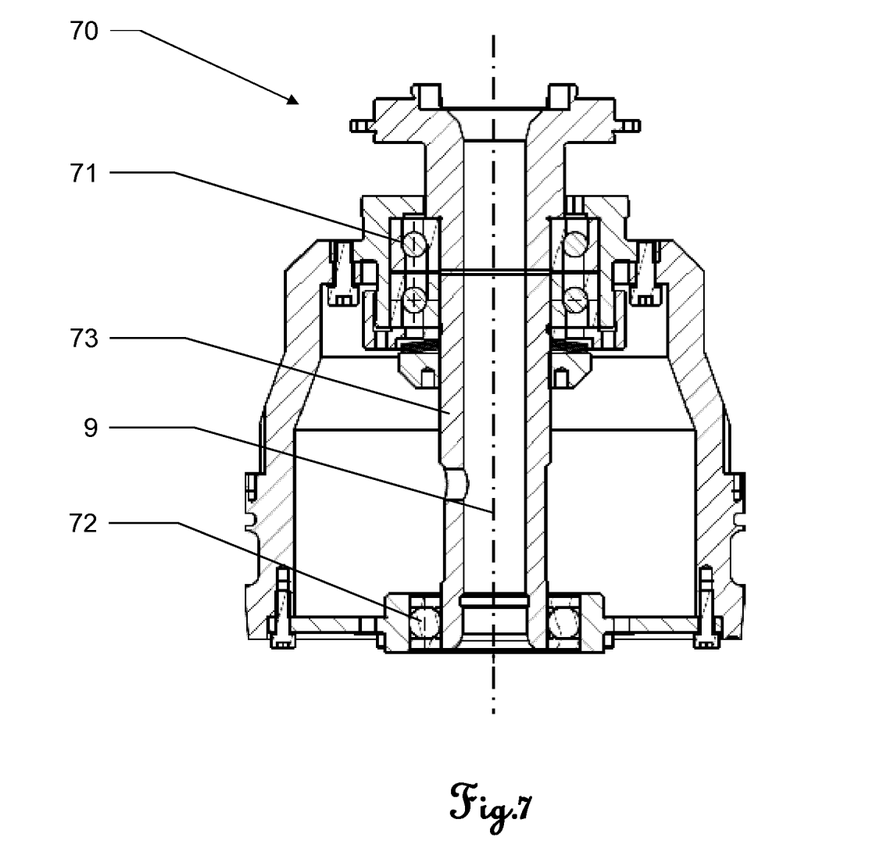
FIG. 7 schematically shows the structure of a vertical fixed/loose bearing for mounting the support on the base.

FIG. 7 shows the arrangement of a fixed bearing 71 and loose bearing 72 of a second fixed/loose bearing apparatus 70 of a coordinate measuring device according to the invention, configured as a laser tracker 1, by means of which the support 20 is fitted rotatably about the upright axis 9 on the base 40 (see also FIG. 3a). A shaft 73 fastened on the support 20 is mounted with a fixed bearing 71 and a loose bearing 72 on the base 40. The shaft 73 is, as represented, preferably a hollow shaft. The fixed bearing 71 is preferably located on the part of the shaft 73 facing toward the support 20, and the loose bearing 72 on the part facing away from the support. The loose bearing 72 is fixed on the shaft 73 and is arranged movably in the axial direction in the base 40, in order to be able to move stress-free with the shaft 73 in the event of thermally induced expansion variations of the latter. The fixed bearing is configured in such a way that it can absorb radial and axial forces. The fixed bearing 71 is preferably also configured in order to be able to absorb forces, in particular axial forces, occurring because of the intrinsic weight of the device—or because of the intrinsic weight of the device parts which can be rotated relative to the base 40 about the upright axis 9—so that the device can also be used "upside down"—that is to say with the support 20 hanging below the base 40.

The second fixed/loose bearing apparatus 70 may be both provided in addition to the first fixed/loose bearing apparatus 60 and combined with another bearing apparatus.

It is to be understood that these represented figures only schematically represent possible exemplary embodiments. The various approaches may likewise be combined with one another and with methods and devices of the prior art.

What is claimed is:

1. A laser tracker for acquiring a position and orientation of a measurement aid mobile in space for measuring a position of a distant target, the laser tracker comprising:
    a base defining an upright axis,
    a support which can be rotated relative to the base about the upright axis,
    a telescope unit which can be rotated relative to the support about a tilt axis and has means for emitting a laser beam towards the measurement aid, an optical distance measuring apparatus for measuring the distance to the measurement aid and a position-sensitive detector for acquiring the laser beam reflected by the measurement aid, so that the orientation of the laser beam can be tracked for continuous target tracking as a function of a position of the reflected laser beam on the detector,
    means for acquiring a rotation angle of the support relative to the base and of the telescope unit relative to the support,
    drive means for motorized rotation of the support relative to the base and of the telescope unit relative to the support,
    a first bearing apparatus having a first shaft, the longitudinal axis of the first shaft extends coaxially with the tilt axis, for mounting the telescope unit on the support, and
    a second bearing apparatus having a second shaft, the longitudinal axis of the second shaft extends coaxially with the upright axis, for mounting the support on the base,
    the first and second bearing apparatuses each comprising a fixed bearing and a loose bearing.

2. A laser tracker for acquiring a position and orientation of a measurement aid mobile in space for measuring a position of a distant target, the laser tracker comprising:
    a base defining an upright axis,
    a support which can be rotated relative to the base about the upright axis,
    a telescope unit which can be rotated relative to the support about a tilt axis and has means for emitting a laser beam towards the measurement aid, an optical distance measuring apparatus for measuring the distance to the measurement aid and a position-sensitive detector for acquiring the laser beam reflected by the measurement aid, so that the orientation of the laser beam can be tracked for continuous target tracking as a function of a position of the reflected laser beam on the detector,
    means for acquiring a rotation angle of the telescope unit relative to the support,
    drive means for motorized rotation of the telescope unit relative to the support, a first bearing apparatus having a first shaft, the longitudinal axis of the first extends coaxially with the tilt axis, for mounting the telescope unit on the support, the first bearing apparatus comprising a fixed bearing and a loose bearing, and
a second bearing apparatus having a second shaft, the longitudinal axis of the second extends coaxially with the upright axis, for mounting the support on the base.

3. The laser tracker as claimed in claim 2, wherein the support comprises a first brace and a second brace, the first brace and the second brace engaging on both sides around the telescope unit at the level of the tilt axis, and the fixed bearing and the loose bearing are arranged on different sides of the telescope unit along the tilt axis, the fixed bearing being arranged in the first brace and the loose bearing being arranged in the second brace.

4. The laser tracker as claimed in claim 3, wherein the drive means comprise a motor, which is configured in order to drive the first shaft in rotation so as to rotate the telescope unit about the tilt axis, the motor being arranged in the first brace.

5. The laser tracker as claimed in claim 2, wherein the telescope unit comprises a measurement camera, which is configured as a focusable video camera system with variable magnification, for acquiring target markings arranged on the measurement aid, so that the spatial orientation of the measurement aid can be determined with the aid of the positions of the target markings which are acquired by the measurement camera.

6. The laser tracker as claimed in claim 2, wherein the telescope unit comprises a localization camera for approximate localization of the measurement aid.

7. The laser tracker as claimed in claim 2, wherein the telescope unit comprises a viewfinder camera to provide images for a user.

8. The laser tracker as claimed in claim 2, wherein the position-sensitive detector comprises a 2D tracking sensor.

9. The laser tracker as claimed in claim 2, wherein the fixed bearing is intended to absorb axial and radial forces, and comprises two pairwise arranged bearings in the form of two individual rolling bearings or a duplex spindle bearing pair.

10. The laser tracker as claimed in claim 2, wherein the loose bearing is intended to absorb radial forces but is not intended to absorb axial forces, and comprises at least one of the following:
a ball bearing with a ball cage;
a sliding bearing;
an air bearing; or
a magnetic bearing.

11. The laser tracker as claimed in claim 2, wherein the fixed bearing is intended to absorb axial and radial forces and is clamped on one side.

12. The laser tracker as claimed in claim 2, wherein the first shaft comprises an opening, extending along a measurement axis, for a beam path of an optical distance measuring apparatus, the measurement axis being defined by an emission direction of the laser beam and/or extending orthogonally to the tilt axis.

13. The laser tracker as claimed in claim 2, wherein the first shaft comprises a first part and a second part,
the first part being mounted on the fixed bearing and being firmly connected to the telescope unit on its side facing toward the fixed bearing; and
the second part being mounted on the loose bearing and being firmly connected to the telescope unit on its side facing toward the loose bearing.

14. The laser tracker as claimed in claim 13, wherein at least one fiber extends at least partially through the first shaft and/or the second shaft.

15. The laser tracker as claimed in claim 13, wherein a first fiber extends at least partially in the support, and is connected to a second fiber, extending at least partially in the telescope unit, using a jack connection while being secured against rotation.

16. The laser tracker as claimed in claim 2, comprising a light guide system for conveying light with at least one light-guiding fiber.

17. The laser tracker as claimed in claim 2, wherein the drive means comprises a direct drive motor.

18. The laser tracker as claimed in claim 2, wherein the drive means comprises a motor which is configured to drive the second shaft in rotation so as to rotate the support about the upright axis.

19. The laser tracker as claimed in claim 2, wherein the first shaft and/or the second shaft is essentially cylindrical.

20. The laser tracker as claimed in claim 2, wherein the first shaft and/or the second shaft is a hollow shaft.

21. The use of the bearing apparatus in a laser tracker as claimed in claim 2, for mounting a telescope unit, which can be rotated about a tilt axis, on a support of the laser tracker and/or for mounting a support, which can be rotated about an upright axis, on a base of the laser tracker, wherein the apparatus comprises a fixed bearing, a loose bearing and a shaft, the longitudinal axis of which extends coaxially with the tilt axis or the upright axis.

22. A laser tracker for acquiring a position and orientation of a measurement aid mobile in space for measuring a position of a distant target, the laser tracker comprising:
a base defining an upright axis,
a support which can be rotated relative to the base about the upright axis,
a telescope unit which can be rotated relative to the support about a tilt axis and has means for emitting a laser beam towards the measurement aid, an optical distance measuring apparatus for measuring the distance to the measurement aid and a position-sensitive detector for acquiring the laser beam reflected by the measurement aid, so that the orientation of the laser beam can be tracked for continuous target tracking as a function of a position of the reflected laser beam on the detector,
means for acquiring a rotation angle of the support relative to the base,
drive means for motorized rotation of the support relative to the base,
a first bearing apparatus having a first shaft, the longitudinal axis of the first shaft extends coaxially with the tilt axis, for mounting the telescope unit on the support, and
a second bearing apparatus having a second shaft, the longitudinal axis of the second shaft extends coaxially with the upright axis, for mounting the support on the base, the second bearing apparatus comprising a fixed bearing and a loose bearing.

23. The laser tracker as claimed in claim 2 or 22, wherein the first shaft has a cylindrical running surface on the fixed bearing and on the loose bearing.

24. The laser tracker as claimed in claim 2 or 22, wherein the second shaft has a cylindrical running surface on the fixed bearing and on the loose bearing.

25. The laser tracker as claimed in claim 2 or 22, wherein the means for acquiring a rotation angle of the support relative to the base includes an angle acquisition unit for acquiring a rotation angle of the second shaft relative to the base.

26. The laser tracker as claimed in claim 22, wherein the fixed bearing is intended to absorb axial forces which, in any orientation of the measuring apparatus, exceed the forces which are induced by the intrinsic weight of those parts of the measuring apparatus that can be rotated relative to the base about the upright axis.

\* \* \* \* \*